United States Patent [19]
Roydhouse

[11] Patent Number: 4,534,944
[45] Date of Patent: Aug. 13, 1985

[54] MERCURY VAPOR SUPPRESSANT

[75] Inventor: Richard H. Roydhouse, Vancouver, Canada

[73] Assignee: Environmental Protection Systems, Limited, Vancouver, Canada

[21] Appl. No.: 546,886

[22] Filed: Oct. 31, 1983

[30] Foreign Application Priority Data

Nov. 4, 1982 [CA] Canada .................................. 414904

[51] Int. Cl.$^3$ ........................ B01D 53/34; C09K 3/32
[52] U.S. Cl. .................................... 423/210; 210/688;
210/914; 252/184
[58] Field of Search .............. 423/210, 221, 514, 557;
210/688, 914; 55/72; 252/189, 190, 192, 182, 184

[56]  References Cited
U.S. PATENT DOCUMENTS

| 3,875,287 | 4/1975 | Kurikami | 423/531 X |
| 4,094,777 | 6/1978 | Sugier et al. | 210/688 X |
| 4,210,437 | 7/1980 | Windgassen et al. | 423/514 X |
| 4,354,942 | 10/1982 | Kaczur et al. | 210/914 |
| 4,369,061 | 1/1983 | Kerley, Jr. | 423/514 X |

OTHER PUBLICATIONS

Chemical Abstracts, 70: 23555u, 1969.
Chemical Abstracts, 84: 9517r, 1976.
Chemical Abstracts, 85: 10813m, 1976.
Chemical Abstracts 86: 9236q, 1977.
Chemical Abstracts 98: 78993u, 1983.

Primary Examiner—Earl C. Thomas
Attorney, Agent, or Firm—Christie, Parker & Hale

[57] ABSTRACT

A composition to absorb mercury vapor and suppress the formation of the vapor. The composition comprises a carrier liquid, for example water, an alcohol or glycol, copper ions, for example copper sulphate and thiosulphate ions, for example sodium thiosulphate. The absorbent is efficient and clean in use.

15 Claims, No Drawings

MERCURY VAPOR SUPPRESSANT

This invention relates to a composition able to absorb mercury vapour and to suppress formation of the vapour and to a method of absorbing and suppressing mercury vapour using the composition.

Liquid mercury is used in industry, hospitals, science laboratories and dental offices. Mercury is a substance of considerable toxicity and mercury contamination may occur by accidental spilling, volatilization or condensation on metal surfaces, e.g. during the process of amalgamation. Mercury liquid or mercury-rich materials can release mercury vapour due to volatilization, especially on warming, and high concentrations can occur in inadequately ventilated areas. Continuous inhalation of low levels of mercury vapour over years can produce symptoms of brain disorder and kidney malfunction. The adverse affects of mercury are demonstrated by the evidence relating extreme symptoms of brain disorder and kidney malfunction in people eating fish caught in waters polluted by mercury. The worst instances appear to have been in Japan but there have also been reported cases in Northern Ontario. Recent reports also show that dentists over age 50 have neurological symptoms, and female dentists may have obstetric problems due to their exposure to mercury and its vapours.

At present two of the most important means of cleaning up mercury spills include powdered sulphur and iodine impregnated on charcoal. However both of these materials have the disadvantages that they require considerable time to react with the mercury. It is also necessary to maintain contact of the powder and the mercury indefinitely and, of course, there is the general messiness of both sulphur and charcoal, which are either fine powders or can easily form fine powders. Charcoal as well is black and, for example, a mercury spill on a colored carpet in a dental office cannot easily be cleaned up by spreading charcoal and maintaining a charcoal layer in contact with the spilled mercury.

In other prior art, copper iodide has been described as a mercury contamination indicator in U.S. Pat. No. 969,020 to Seidenberger. Zhang in the journal Huanjing Kexue of the People's Republic of China, Volume 1, issue 1, pages 29-34 (1980), describes a method for recovering mercury dissolved in dilute salt solutions using silver thiosulphate-treated activated carbon. Of course the use of silver in a mercury removal device is prohibitively expensive.

Irkhin et al in Russian Pat. No. 688,440 describes the use of alkaline sodium thiosulphate for the removal of dissolved mercury from the effluent of plants manufacturing organic chemicals. A Romanian patent to Zeana et al, Romanian Pat. No. 63,241, describes the use of sodium thiosulphate in calcium chloride-containing Solvay process wastes.

Further prior art includes U.S. Pat. No. 4,094,777 to Sugier, which describes a process for removing mercury from a gas or liquid by absorption on a solid mass that contains copper sulphide and Kurikami, in U.S. Pat. No. 3,875,287, describes a method of removing mercury from highly concentrated sulphuric acid by adding iodides to precipitate the mercury as mercuric iodide.

The present invention seeks to provide a composition and a method able to provide improved absorption and suppression of mercury vapour and in which the use of the composition in the method is free of a number of the disadvantages of the prior art. The composition reacts with the mercury liquid to convert it to a solid which no longer emits mercury vapour.

Accordingly, in a first aspect, the present invention is a mercury vapour absorbent and suppressant comprising a carrier liquid, copper ions and thiosulphate ions.

In a second aspect the present invention is a method of absorbing mercury that comprises contacting the mercury with a composition that comprises a liquid carrier containing copper ions and thiosulphate ions.

In its simplest aspect the present invention is an aqueous solution of copper ions and thiosulphate ions. In a further desirable aspect the solution may also contain iodide ions, an alcohol, for example isopropyl alcohol and a glycol, for example ethylene or propylene glycol. In still further aspects the composition may include solids such as sulphur and silica. Iodine may also be present.

The invention is further illustrated in the following experiments which show the advantage of using various combinations of ingredients to effect the clean up of mercury.

EXPERIMENT 1

1. Seventy milligrams of liquid mercury was added to each of 15 Erlenmeyer flasks of 50 ml volume.
2. These flasks were placed in a shaker to agitate the mercury at $25 \pm 3°$ C. to simulate a mercury spill.
3. To each flask was added 10 ml of a solution as designated in Table 1. A sealing bung was placed in the top of each flask.
4. At the times designated in Table 1 a bung fitted with two tubes was inserted in place of the sealing bung and air blown in through one tube to discharge vapour from the other, or outlet, tube. The outlet tube was connected to a mercury vapour monitoring device, for example a Coleman 50 meter.
5. The flasks were vented with air at 1 to 2 liters per minute through a Coleman 50 mercury monitor which monitors the mercury content of the air sample according to its ability to absorb ultraviolet light at a wavelength characteristic of mercury.
6. After measuring the relative mercury content of the purged air samples as shown in Table 1, the Erlenmeyer flasks were resealed with the sealing bungs and reagitated in the shaker bath.

The results achieved are set out in Table 1, which indicates that mercury absorbing mixtures containing copper ions and thiosulphate ions are superior to those mixtures lacking either one of these components. Alcohols are added to the copper and thiosulphate-containing mixtures to improve wetting of the mercury and prevent drying of the solution due to evaporation of the water. This is seen as a major advantage of using an alcohol (for example ethylene glycol or propylene glycol) which has a very low vapour pressure. Comparison of runs 12 and 13 in Table 1 indicate that the presence of iodide improves the performance of a solution that contains copper ion and thiosulphate ion as well as alcohols. A ranking of "1" in Table 1 corresponds to less than 10 micrograms of mercury/cubic meter of air. Mercury absorber #1, which was a blank, released mercury at levels in the range of 3500–4000 micrograms/cubic meter of air. None of the copper and thiosulphate containing mercury absorbers released mercury at levels in excess of 20 micrograms/cubic meter of air.

TABLE 1

Relative Efficiency of Mercury Absorbing Mixtures

| Mercury absorber # | Mercury Absorber Composition | | | | | | | | Relative Mercury Absorber Efficiency Absorption time in hours | | | | | |
|---|---|---|---|---|---|---|---|---|---|---|---|---|---|---|
| | water ml. | sulphur grams | silica grams | glycol ml. | isopropyl alcohol (ml) | $CuSO_4 \cdot 5H_2O$ grams | potassium iodide grams | sodium thiosulphate grams | 0 | 20 | 92 | 816 | 840 | Sum of rankings |
| 1 | — | — | — | — | — | — | — | — | 12 | 11 | 11 | 9 | 8 | 51 |
| 2 | 10 | | | | | | | | 8 | 5 | 8 | 9 | 8 | 38 |
| 3 | 6.5 | — | — | 1.5 | 2.0 | — | — | — | 5 | 7 | 9 | 7 | 8 | 36 |
| 4 | — | 1.0 | — | 4.3 | 5.7 | — | — | — | 7 | 4 | 2 | 1* | 5 | 19 |
| 5 | — | — | 1.0 | 4.3 | 5.7 | — | — | — | 6 | 6 | 8 | 5 | 6 | 31 |
| 6 | — | 0.5 | 0.5 | 4.3 | 5.7 | — | — | — | 10 | 5 | 4 | 6 | 8 | 33 |
| 7 | 10.0 | — | — | — | — | 0.16 | 0.26 | 0.11 | 1 | 3 | 2 | 3 | 3 | 12 |
| 8 | 10.0 | — | — | — | — | 0.16 | — | 0.11 | 1 | 1 | 2 | 1 | 1 | 6 |
| 9 | 10.0 | — | — | — | — | — | 0.26 | 0.11 | 11 | 8 | 7 | 4 | 4 | 34 |
| 10 | 10.0 | — | — | — | — | — | — | 0.11 | 9 | 9 | 10 | 8 | 7 | 43 |
| 11 | — | — | 1.0 | 4.3 | 5.7 | 0.16 | 0.26 | 0.11 | 2 | 2 | 1 | 1 | 1 | 7 |
| 12 | — | 1.0 | — | 4.3 | 5.7 | 0.16 | 0.26 | 0.11 | 1 | 2 | 2 | 1 | 1 | 7 |
| 13 | 6.5 | — | — | 1.5 | 2.0 | 0.16 | — | 0.11 | 3 | 4 | 2 | 1 | 1 | 11 |
| 14 | — | 1.0 | — | 4.3 | 5.7 | — | 0.26 | 0.11 | 4 | 4 | 3 | 2 | 2 | 15 |
| 15 | 6.5 | 0.5 | 0.5 | 1.5 | 2.0 | 0.16 | 0.26 | 0.11 | 1 | 1 | 2 | 1 | 1 | 6 |

*Absorbers are ranked in order of effectiveness so the "1" indicates best efficiency.
Lowest "sum of ranking" indicates most effective absorber weighted equally over all time intervals.

In the experiments carried out ethylene glycol may be replaced by propylene glycol without disadvantage.

EXPERIMENT 2

The purpose of this experiment was to determine the efficiency of various halide-containing salt solutions as mercury absorbers either alone or in combination with copper ions and thiosulphate ions.

The experiment was carried out in analogous fashion to experiment 1 except the Erlenmeyer flasks were heated to 40° C. after 216 hours. The results are set out in Table 2 and indicate that iodide-copper-thiosulphate mixtures have superior mercury absorbing properties to other combinations, including thiosulphate-iodine mixtures or iodine contained in water.

TABLE 2

Relative Efficiency of Mercury Absorbing Mixtures Containing Different Halides

| Sample Name | Ingredients (30 ml of liquids) | | | | | | | Weighted Ranking | Relative Mercury Absorber Efficiency Time in Hours | | | | | |
|---|---|---|---|---|---|---|---|---|---|---|---|---|---|---|
| | Nacl 1M | KBr 1M | KI 1M | $CuSO_4$ 1M | $Na_2S_2O_3$ final solution weight/volume % | $H_2O$ | Iodine | | 0 | 4 | 24 | 72 | 144 | 216 |
| Mcl | 20 ml | | | 10 ml | | | | 25 | 5 | 5 | 4 | 5 | 2 | 4 |
| MB | | 20 ml | | 10 ml | | | | 15 | 3 | 3 | 2 | 3 | 1 | 3 |
| MK | | | 20 ml | 10 ml | | | | 15 | 1 | 1 | 1 | 4 | 3 | 5 |
| MK1/2 | | | 20 ml | 10 ml | 1/2 | | | 9 | 1 | 1 | 1 | 2 | 2 | 2 |
| MK2 1/2 | | | 20 ml | 10 ml | 2 1/2 | | | 10 | 1 | 1 | 1 | 4 | 2 | 1 |
| MK5 | | | 20 ml | 10 ml | 5 | | | 6 | 1 | 1 | 1 | 1 | 1 | 1 |
| Hypo | | | | | 3% | | 0.1 g | 23 | 4 | 4 | 3 | 2 | 4 | 6 |
| $M_2O$ | | | | | | 30 ml | 0.1 g | 27 | 2 | 2 | 5 | 6 | 5 | 7 |
| °C. | | | | | | | | | 25–30 | | | | 40° | |

Thus the present invention provides improved mercury cleaning compositions. These compositions may be a liquid containing copper ions and thiosulphate ions and, in a preferred aspect, also iodide ions. This composition may also contain an alcohol, ethylene glycol, propylene glycol or other surface active agent and sulphur particles.

The compositions according to the present invention work effectively because they react rapidly with mercury to form non-volatile insoluble products and contact mercury extremely well, especially where the composition includes a surfactant or alcohol.

The embodiments of the invention in which an exclusive property or privilege is claimed are defined as follows:

1. A composition to absorb mercury vapour and to suppress the formation of mercury vapour, the composition comprising:
   (a) a polyhydric alcohol as a carrier liquid;
   (b) copper ions and;
   (c) thiosulphate ions.

2. A composition as claimed in claim 1 in which the carrier liquid is a glycol.

3. A composition as claimed in claim 2 in which the glycol is selected from ethylene glycol and propylene glycol.

4. A composition as claimed in claim 1 including iodide ions.

5. A composition in aqueous solution able to absorb and to suppress mercury vapour, the composition comprising copper sulphate pentahydrate, sodium thiosulphate and potassium iodide.

6. A composition as claimed in claim 5 including an alcohol.

7. A composition as claimed in claim 6 in which the alcohol comprises a mixture of ethylene glycol with isopropyl alcohol.

8. An absorbent as claimed in claim 7 further including silica.

9. A composition as claimed in claim 7 further including sulphur.

10. A process for absorbing mercury that comprises contacting the mercury with a composition that comprises a polyhydric alcohol as a liquid carrier and containing copper ions and thiosulphate ions.

11. A process as claimed in claim 10 in which the carrier liquid is water.

12. A process as claimed in claim 10 in which the composition also contains iodide ions.

13. A process as claimed in claim 10 in which the composition includes copper sulphate pentahydrate and sodium thiosulphate.

14. A process as claimed in claim 13 in which the composition further includes potassium iodide.

15. A composition as claimed in claim 6 in which the alcohol is a polyhydric alcohol.

* * * * *